United States Patent
Ito

(10) Patent No.: US 8,860,823 B2
(45) Date of Patent: Oct. 14, 2014

(54) IMAGING APPARATUS, ADAPTER DEVICE THEREROF, AND INFORMATION PROCESSING METHOD

(75) Inventor: Kan Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 12/490,211

(22) Filed: Jun. 23, 2009

(65) Prior Publication Data

US 2009/0316005 A1    Dec. 24, 2009

(30) Foreign Application Priority Data

Jun. 24, 2008 (JP) ................................. 2008-164976

(51) Int. Cl.
| | | |
|---|---|---|
| *H04N 5/225* | (2006.01) | |
| *G06K 9/00* | (2006.01) | |
| *H04N 5/765* | (2006.01) | |
| *G06F 17/30* | (2006.01) | |
| *G06F 21/62* | (2013.01) | |
| *H04N 9/804* | (2006.01) | |
| *H04N 5/775* | (2006.01) | |
| *H04N 5/77* | (2006.01) | |
| *H04N 5/907* | (2006.01) | |

(52) U.S. Cl.
CPC .......... *H04N 5/765* (2013.01); *G06F 17/30265* (2013.01); *G06F 17/30247* (2013.01); *H04N 9/8047* (2013.01); *H04N 9/8042* (2013.01); *G06F 21/6245* (2013.01); *H04N 5/775* (2013.01); *H04N 5/772* (2013.01); *H04N 5/907* (2013.01)
USPC ...................................... 348/208.14; 382/115

(58) Field of Classification Search
USPC ........ 348/207.1, 208.14, 211.2, 231.2–231.5; 382/115, 118
See application file for complete search history.

(56) References Cited

U.S. PATENT DOCUMENTS

| | | | | |
|---|---|---|---|---|
| 7,440,594 | B2 * | 10/2008 | Takenaka ....................... | 382/118 |
| 7,456,871 | B2 * | 11/2008 | Iida et al. .................... | 348/231.5 |
| 2002/0049728 | A1 * | 4/2002 | Kaku ................................ | 707/1 |
| 2004/0008258 | A1 | 1/2004 | Aas | |
| 2005/0110634 | A1 * | 5/2005 | Salcedo et al. ............. | 340/539.1 |
| 2006/0211493 | A1 * | 9/2006 | Walker et al. ................... | 463/29 |

FOREIGN PATENT DOCUMENTS

| | | |
|---|---|---|
| JP | 2004-062868 A | 2/2004 |
| JP | 2006-080891 A | 3/2006 |

\* cited by examiner

*Primary Examiner* — Trung Diep
(74) *Attorney, Agent, or Firm* — Canon U.S.A., Inc. IP Division

(57) ABSTRACT

A method for processing information in an adapter device for an imaging apparatus includes acquiring user identification information registered in the imaging apparatus connected to the adapter device, acquiring user identification information of a person identification reference database stored in a storage medium inserted in the adapter device, determining whether the user identification information acquired from the imaging apparatus corresponds to the user identification information acquired from the person identification reference database, determining whether a person registered in the person identification reference database is included in an image acquired by the imaging apparatus when it is determined that the pieces of the user identification information correspond to each other, and recording personal information of the person stored in the person identification reference database in attribute information of the image when it is determined that the person registered in the person identification reference database is included in the image acquired by the imaging apparatus.

6 Claims, 4 Drawing Sheets

IMAGING APPARATUS, ADAPTER DEVICE THEREROF, AND INFORMATION PROCESSING METHOD

BACKGROUND OF THE INVENTION

1. Field of the Invention

The present invention relates to an imaging apparatus, an adapter device of the imaging apparatus, and an information processing method.

2. Description of the Related Art

Technical guidelines referred to as Digital Living Network Alliance (DLNA) has been established to formulate specifications for interconnecting digital audio visual equipment and personal computers (PCs) for the purpose of sharing data of moving images, music, and still images with each other in a home network. According to the guidelines, a digital camera, a digital versatile disk (DVD) video camera, or the like can be connected to a camera adapter device that has a server function, so that files of moving images, music, and still images recorded on a recording medium in the camera are stored in the camera adapter device. The files of the moving images, music, and the still images are reproduced by a network media player that accesses the camera adapter device via a local area network (LAN). The files of the moving images, music, and still images can be transferred from the camera adapter device to a storage terminal to be stored therein.

In a camera adapter system, when the digital camera is connected to the camera adapter device and the photographed images are transferred to and stored in the storage terminal via the LAN, a user may want to sort the images according to a person in the images. Japanese Patent Application Laid-Open No. 2004-62868 discusses a technique for checking a face of a person included in a photographed image with a person identification reference database on a server, identifying the person automatically, and recording a name of the person in the image. Japanese Patent Application Laid-Open No. 2006-80891 discusses a technique for sorting photographed images according to an identified person when the face-identified photographed images are transferred to a PC or the like.

However, there are concerns about security if a person identification reference database used to identify a person on an image is stored in a server (camera adapter device) and anyone can use the database.

SUMMARY OF THE INVENTION

The present invention is directed to solving a security problem, identifying a person included in an image photographed by an imaging apparatus and storing information of the person with the image.

According to an aspect of the present invention, an imaging apparatus includes an imaging apparatus user identification information acquisition unit configured to acquire user identification information registered in the imaging apparatus, a database user identification information acquisition unit configured to acquire user identification information of a person identification reference database stored in a storage medium inserted in the imaging apparatus, an identification information determination unit configured to determine whether the user identification information registered in the imaging apparatus user identification information acquisition unit corresponds to the user identification information of the person identification reference database user identification information acquisition unit, a person determination unit configured to determine whether a person registered in the person identification reference database is included in an image captured by an imaging unit when the identification information determination unit determines that the pieces of the user identification information correspond to each other, and a recording unit configured to record personal information of the person stored in the person identification reference database in attribute information of the image when the person determination unit determines that the person registered in the person identification reference database is included in the image acquired by the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
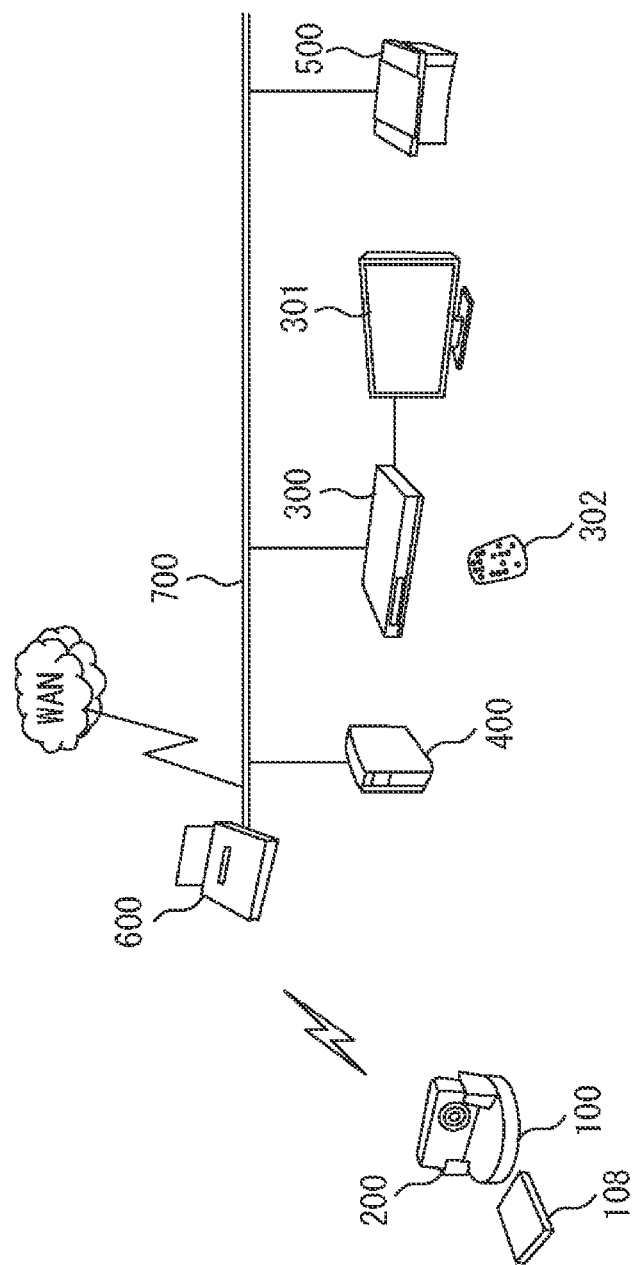
FIG. 1 illustrates an example of a system configuration of a camera adapter system.

FIG. 1 illustrates an example of a system configuration of a camera adapter system. In the camera adapter system, a digital camera 200, a camera adapter device 100, a display adapter terminal 300, a display 301, a storage terminal 400, and a printer terminal 500 are interconnected via a LAN 700 in a home.

Normally, a user attaches an electric cell or a battery to the digital camera 200 when the user leaves the home and captures images. When returning home, the user mounts the digital camera 200 on the camera adapter device 100. The camera adapter device 100 transmits a moving image stream in a Motion Joint Photographic Experts Group (MJPEG) format captured by the digital camera 200 or a still image file in a JPEG format captured by the digital camera 200 to the display adapter terminal 300 via a wireless access point 600.

A CompactFlash™(CF) card 108 is an external media storage which is attachable and detachable to/from the camera adapter device 100. When the digital camera 200 is mounted on the camera adapter device 100, the CF card 108 can record and store an image captured by the digital camera 200 before mounting or during mounting. The user can carry the CF card 108. The wireless access point 600 performs wireless communication with the camera adapter device 100 to mediate the connection between the LAN 700 that is a packet communication network. A remote controller 302 operates the display adapter terminal 300 based on an operation by the user. Further, the remote controller 302 can operate the camera adapter device 100 that mounts the digital camera 200 via the LAN 700 and the wireless access point 600.

The display adapter terminal 300 receives media streams transmitted from the digital camera 200 and the camera adapter device 100, decodes each medium coded in various formats, and outputs the decoded medium to the display 301. The storage terminal 400 which is an example of a data storage device acquires the image captured by the digital camera 200 via the LAN 700 and records the image. The storage terminal 400 further may be provided with applications such as an electronic album for managing and searching images, or a moving image editing application. The printer terminal 500 receives media streams transmitted from the digital camera 200 and the camera adapter device 100, decodes each medium coded in various formats, and prints the decoded medium.

Functions of the digital camera 200 and the camera adapter device 100 in the camera adapter system configuration are described in detail.

Figure 2:
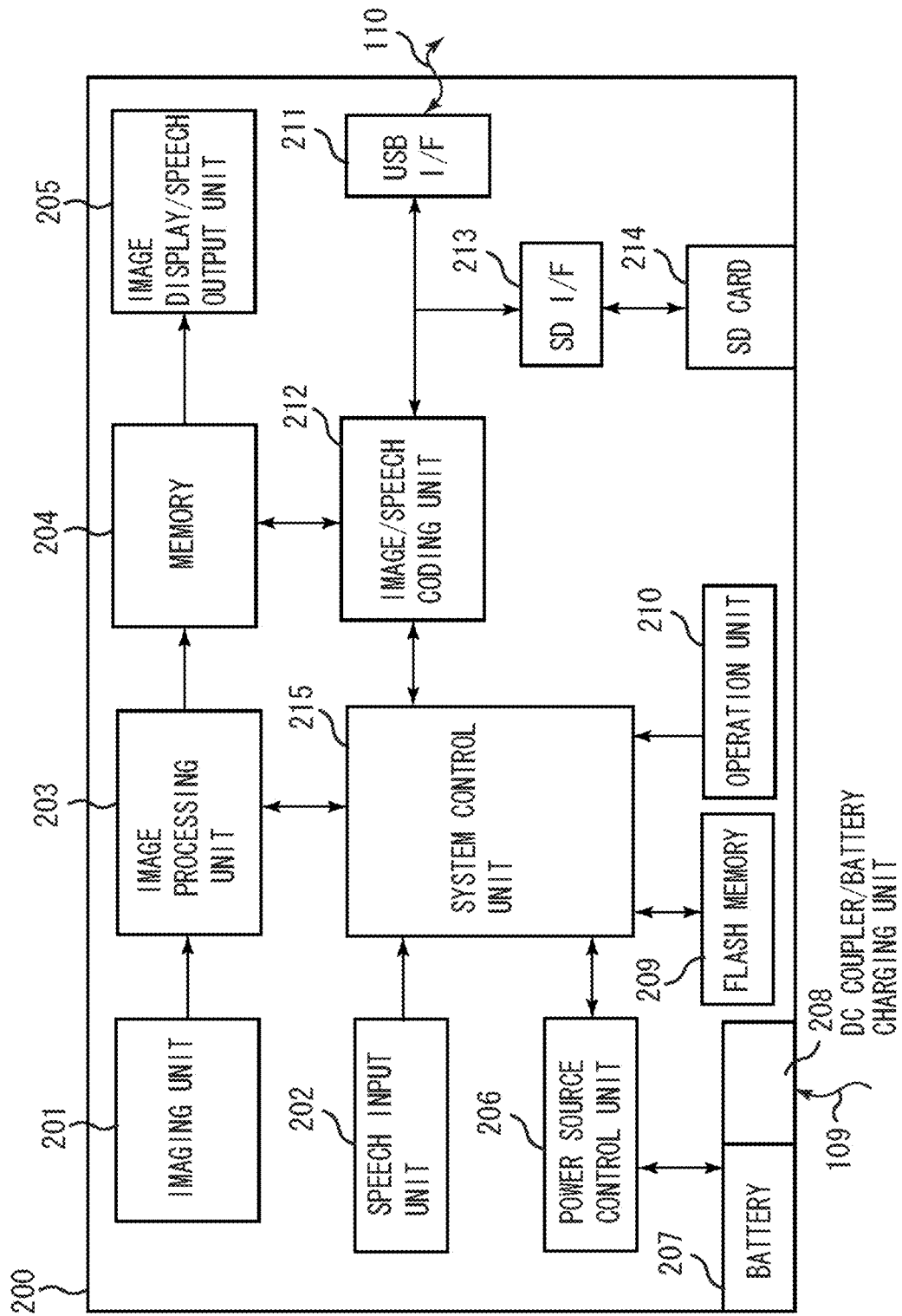
FIG. 2 illustrates an example of a hardware configuration of a digital camera.

FIG. 2 illustrates an example of a hardware configuration of the digital camera 200. An imaging unit 201 performs predetermined processing on a signal that is photoelectrically converted by an image sensor such as a charge-coupled device (CCD) and a complementary metal-oxide semiconductor (CMOS) sensor, and outputs the signal to an image processing unit 203. The image processing unit 203 performs predetermined pixel interpolation or color conversion processing on the digital image signal from the imaging unit 201. Further, the image processing unit 203 performs predetermined arithmetic processing using the photographed digital image signal. Based on the obtained calculation result, a system control unit 215 performs automatic focus (AF) processing and automatic exposure (AE) processing. Further, the image processing unit 203 performs predetermined arithmetic processing using the photographed digital image signal, and performs automatic white balance (AWB) processing according to a through the lens (TTL) system based on the obtained calculation result.

A memory 204 stores photographed still image and moving image. The memory 204 has a storage capacity large enough to store a predetermined number of sheets of still images or a predetermined time period of moving images. Further, the memory 204 has a function as a memory to display an image and output speech by an image display/speech output unit 205. The image display/speech output unit 205 includes a thin-film transistor (TFT), a liquid crystal display (LCD), and a speaker. The image display/speech output unit 205 displays and outputs the image data for display and speech data written in the memory 204. The digital camera 200 uses the image display/speech output unit 205 to sequentially display the photographed images and realize an electronic view finder function.

An image/speech coding unit 212 performs predetermined compression/decompression and multiplexing processing according to the MJPEG format on a moving image or according to the JPEG format on a still image together with a digital image signal of a Y, Cr/Cb format and a speech signal recorded by a speech input unit 202. The image/speech coding unit 212 reads the image and speech stored in the memory 204 and performs the compression or decompression processing. Then, the image/speech coding unit 212 writes the processed moving image, still image, and speech data in the memory 204 again.

The speech input unit 202 is used to record speech or as speech input when a moving image is photographed. The system control unit 215 performs overall control of the digital camera 200. A flash memory 209 is an electrically erasable and recordable nonvolatile memory. An operation unit 210 includes various buttons and a touch panel. The user uses a menu button, a set button, a cross key, or the like on the operation unit 210 to perform all setting relating to a photographing function of the digital camera 200.

A power source control unit 206 includes a battery detection circuit, a direct current (DC)-DC converter, a switch circuit for switching blocks to supply an electric power, and the like. The power source control unit 206 detects whether a battery is attached, a type of the battery, and a remaining battery capacity. The power source control unit 206 supplies necessary voltage to each unit in the digital camera 200 for a necessary time period based on the detection result and an instruction from the system control unit 215. A battery 207 is a secondary battery such as a nickel cadmium battery and a lithium ion battery. A DC coupler/battery charging unit 208 supplies an electric power to the camera adapter device 100 and the battery 207 when the digital camera 200 is connected to the camera adapter device 100 and receives the power supply via a power cable 109.

A universal serial bus (USB) interface (I/F) unit 211 is a communication interface that sends and receives an image or control data to and from the camera adapter device 100. In the present exemplary embodiment, communication using a USB 110 is described. However, the other communication methods, for example, a communication method using IEEE 1394 may be employed. In such a case, as the USB I/F unit 211, an interface complying with the corresponding communication standard is employed. A secure digital (SD) card 214 is a recording medium. The digital camera 200 writes a photographed (captured) image in the SD card 214 via a SD I/F 213. In place of the SD card 214, the other recording media such as a CF card and a Microdrive™ may be used. In such a case, as the SD I/F unit 213, an interface complying with a standard of the corresponding recording medium is employed.

Figure 3:
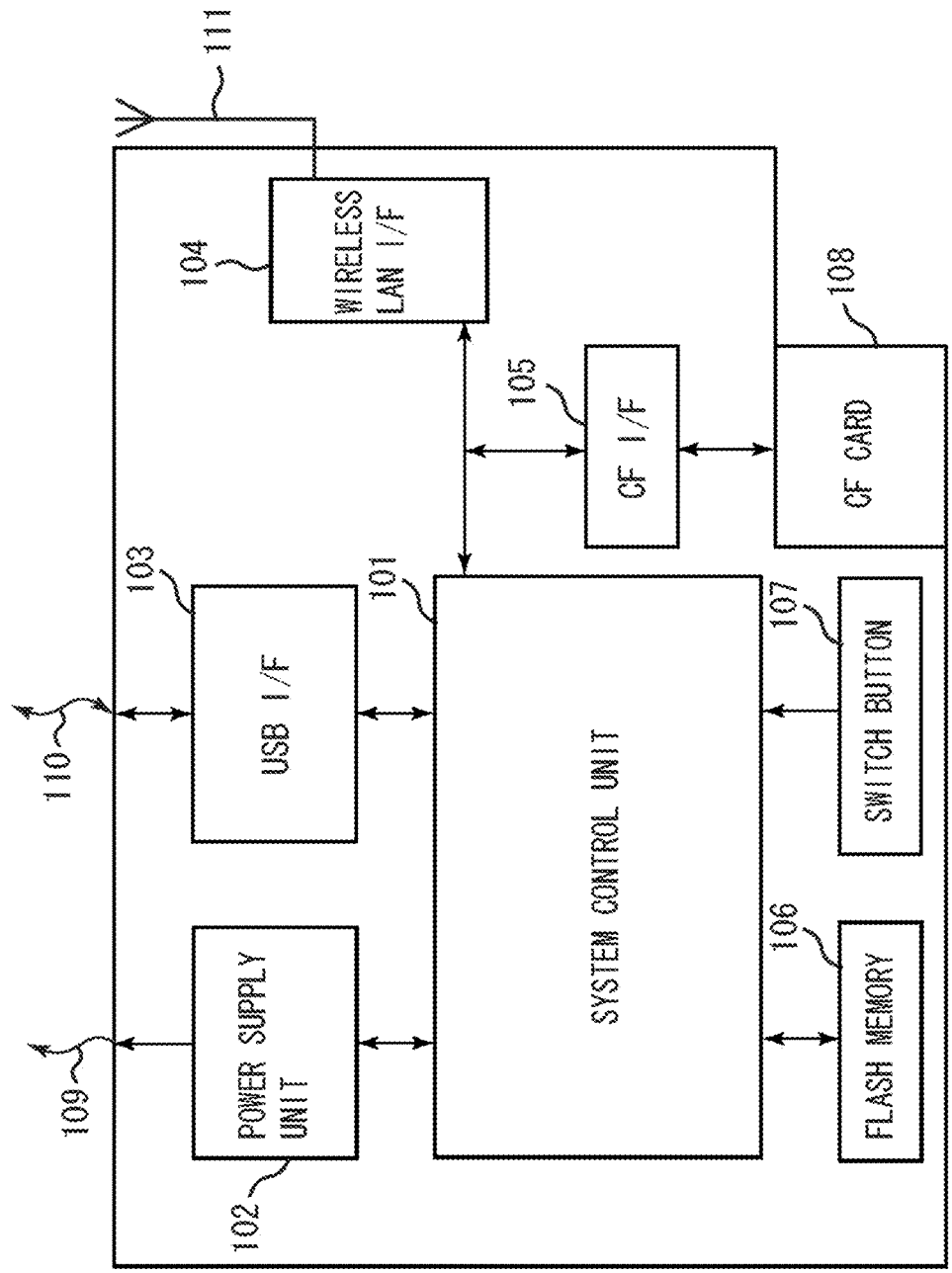
FIG. 3 illustrates an example of a hardware configuration of a camera adapter device.

FIG. 3 illustrates an example of a hardware configuration of the camera adapter device 100. A power supply unit 102 performs power supply via the power cable 109 when the digital camera 200 is connected to the camera adapter device 100. When the digital camera 200 is connected to the camera adapter device 100 in a state the battery 207 is attached, the power supply unit 102 supplies power to charge the battery 207. A communication interface USB I/F unit 103 sends and receives an image or control data to and from the digital camera 200. A flash memory 106 is an electrically erasable and recordable nonvolatile memory.

By pressing a switch button 107, the user can, for example, copy a file of a moving image or a still image recorded in the SD card 214 in the digital camera 200 to the CF card 108 that is the recording medium inserted in the camera adapter device 100. Alternatively, by operating the switch button 107, the user can start a functional operation of the camera adapter device 100, for example, to transfer an image to the display adapter terminal 300 via a wireless LAN I/F 104, the wireless access point 600, and the LAN 700.

A CF card 108 is a recording medium. The camera adapter device 100 writes a moving image file or a still image file photographed by the digital camera 200 in the CF card 108 by communication using the USB 110 via the USB I/F 103 and a CF I/F 105. Further, the camera adapter device 100 transfers the moving image file or the still image file written in the CF card 108 to the display adapter terminal 300 via the CF I/F 105, the wireless LAN I/F 104, the wireless access point 600, and the LAN 700. The CF card 108 stores a person identification reference database that is reference data for identifying a face of a person who is an object in a photographed image.

The camera adapter device 100 checks face data registered in the person identification reference database with the person in the image photographed by the digital camera 200. When the face data matches to the person, the camera adapter device 100 transfers a person identification (ID) such as a mail address of the person while recording the person ID as metadata of the image data. The CF card 108 may be the other recording media such as an SD card and a Microdrive™. In such a case, as the CF I/F 105, an interface complying with a standard of the corresponding recording medium is employed. The wireless LAN I/F 104 performs adaptation in wireless communication to the wireless access point 600 by an antenna unit 111. The system control unit 101 performs overall control of the camera adapter device 100. Further, the system control unit 101 detects and issues an instruction to each of the power supply unit 102, the USB I/F 103, the CF I/F 105, and the wireless LAN I/F 104.

A number of devices that is connected to the network, such as the camera adapter device 100, the wireless access point 600, the display adapter terminal 300, the printer terminal 500, and the storage terminal 400 is not limited to the number illustrated in FIG. 1 according to the present exemplary embodiment. As long as the devices can be identified by addresses or the like, a plurality of devices may be connected. As the LAN 700, any network such as the Internet or an intranet that has bands large enough to transmit a compressed image may be employed. As the display adapter terminal 300, it is assumed that, for example, a PC, a cell-phone, a personal digital assistance (PDA), or a network television is employed. Accordingly, a wired or wireless system may be employed as a physical connection with the LAN 700. Further, as long as the connection with the LAN 700 is established by a protocol, any system may be employed.

In the above-described configuration, the user connects the digital camera 200 to the camera adapter device 100. Then, the user operates a reception terminal of the display adapter terminal 300 or the storage terminal 400 to transfer a still image file recorded in the SD card 214 inserted in the digital camera 200 via the LAN 700 to the storage terminal 400 and store the file therein. Hereinafter, the operation in the camera adapter system is described.

Figure 4:
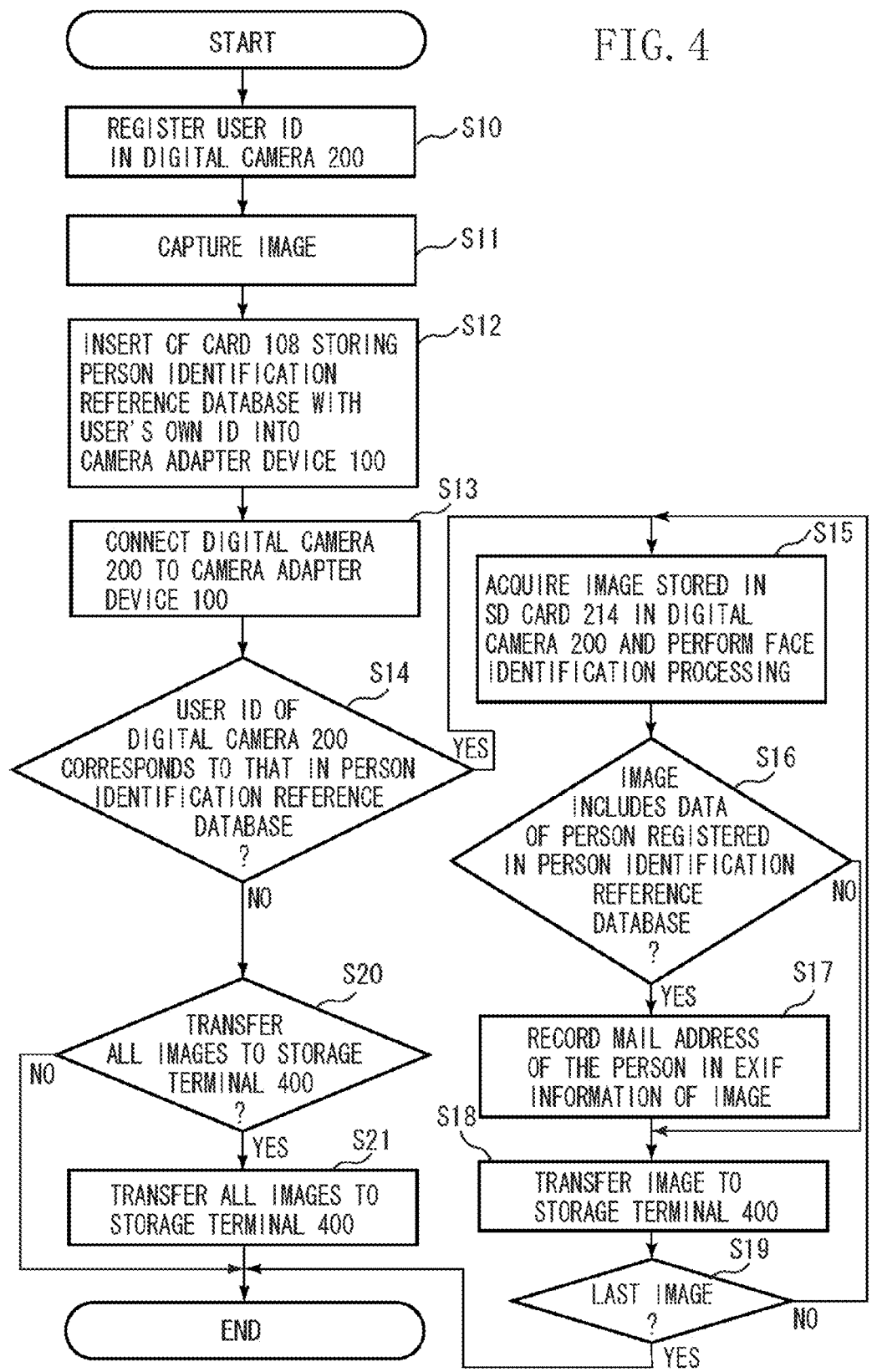
FIG. 4 is a flowchart illustrating an example of a processing procedure in a camera adapter system.

FIG. 4 is a flowchart illustrating an example of the processing in the camera adapter system.

In step S10, the user operates the remote controller 302 and registers a name or an ID of the user in the flash memory 209 in the digital camera 200 via the display adapter terminal 300, the LAN 700, the wireless access point 600, the camera and adapter device 100. Hereinafter, the registered ID is referred to as a user ID (user identification information). However, a plurality of pieces of the user ID may be registered in the digital camera 200. The user can directly operate the digital camera 200 to register the user ID.

In step S11, the user captures an image using the digital camera 200. When the user wants to store an image in the storage terminal 400 at home, after returning home, the user transfers the image from the camera adapter device 100 that is connected to the LAN in the home to the storage terminal 400. When the user wants to transfer the image to the storage terminal 400 at home from outside the home, the user transfers the image from the camera adapter device 100 that is provided in the camera adapter system of the outside to the storage terminal 400 at home by remote access to store the image therein. The remote access is a system that allows the user to use a LAN in a remote location equally as the LAN at home in a virtual state. Accordingly, a case where the image is transferred from the camera adapter device 100 that is connected to the LAN at home and stored into the storage terminal 400 at home is described as an example.

In step S12, when the user returns home from the outside, before storing the image, the user inserts the CF card 108 that stores a person identification reference database, in which the user's own user ID is registered, for identifying a face in an image into the camera adapter device 100. In the person identification reference database, face information of a person is associated with a person ID such as a mail address of the person. The user generates and records the database in the CF card 108 in advance. When new data is provided, the user updates the database as needed. In step S13, after inserting the CF card 108 into the camera adapter device 100, the user connects the digital camera 200 to the camera adapter device 100.

The system control unit 101 in the camera adapter device 100 instructs the system control unit 215 in the digital camera 200 to transmit the user ID registered in the flash memory 209 in the digital camera 200 and reads the user ID via the USB 110. More specifically, the system control unit 101 in the camera adapter device 100 acquires the user ID from the digital camera 200. Further, the system control unit 101 in the camera adapter device 100 acquires the user ID of the person identification reference database recorded in the CF card 108.

In step S14, the camera adapter device 100 determines whether the user ID read from the digital camera 200 corresponds to the user ID of the person identification reference database. As the result of the determination, when the user IDs correspond to each other (YES in step S14), the processing in the camera adapter device 100 proceeds to step S15. Whereas when the user IDs do not correspond to each other (NO in step S14), the processing in the camera adapter device 100 proceeds to step S20.

In step S20, the camera adapter device 100 inquires of the user whether to transfer all still image files recorded in the SD card 214 in the digital camera 200 to the storage terminal 400 as they are. The camera adapter device 100 may display the inquiry to the user on the image display/speech output unit 205 of the digital camera 200 and receive a reply to the inquiry from the digital camera 200. The camera adapter device 100 may display the inquiry to the user on the display 301 via the network and receive a reply to the inquiry from the remote controller 302 or the display adapter terminal 300.

When the user determines to transfer all of the still image files recorded in the SD card 214 to the storage terminal 400 (YES in step S20), in step S21, the camera adapter device 100 transfers all the still image files to the storage terminal 400 as they are and the processing ends. When the user does not determine to transfer all of the still image files recorded in the SD card 214 to the storage terminal 400 (NO in step S20), the processing ends without doing anything.

In step S15, the system control unit 101 in the camera adapter device 100 notifies the digital camera 200 of a request to transfer the still image files recorded in the SD card 214 in the digital camera 200 using the USB 110. The system control unit 101 in the camera adapter device 100 reads the still image files one by one, and detects a face from the read image. For example, the camera adapter device 100 generates an average face pattern from face patterns of several persons as a template. Then, the camera adapter device 100 calculates a correlation between the read image and the template, and determines an area where the correlation value is high as a face.

In step S16, based on information about the detected face (face information), the camera adapter device 100 searches the person identification reference database for face information to determine whether corresponding face information exists. More specifically, the camera adapter device 100 determines whether a person registered in the person identification reference database is included in the image. When the corresponding face information exists (the person registered in the person identification reference database is included in the image) (YES in step S16), the processing in the camera adapter device 100 proceeds to step S17. Whereas when the corresponding face information does not exist (the person registered in the person identification reference database is not included in the image) (NO in step S16), the processing in the camera adapter device 100 proceeds to step S18.

In step S17, the camera adapter device 100 records a person ID (personal information) such as a mail address of the corresponding person in an item included in exchangeable image file format (Exif) information (attribute information) of the image (still image file) recorded according to a still image format of the Exif format. The camera adapter device 100, for example, may generate an item of the person ID in an item of manufacturer's unique information, and record the person ID in the generated item.

In step S18, the camera adapter device 100 transfers the image (still image file) from the wireless LAN I/F 104 to the storage terminal 400 via the LAN 700. Instep S19, according to the above-described processing, the camera adapter device 100 searches all of the still image files recorded in the SD card 214 in the digital camera 200 and transfers them to the storage terminal 400. When the transfer of all images is completed (YES in step S19), the processing ends.

In the still image file transferred to and stored in the storage terminal 400, when the still image file includes a person who corresponds to a person searched in the person identification reference database, the person ID is recorded in the Exif information. For example, the storage terminal 400 can sort the stored still image files according to the person ID.

Basically, the camera adapter device 100 communicates with the storage terminal 400 by Transmission Control Protocol/Internet Protocol (TCP/IP). However, the camera adapter device 100 may communicate with the storage terminal 400 according to an application communication protocol such as Hypertext Transfer Protocol (HTTP) or Session Initiation Protocol (SIP).

In the above-described exemplary embodiment, the CF card 108 that records the person identification reference database is inserted into the camera adapter device 100 and the person identification check is performed. However, the person identification reference database may be recorded in the SD card 214 in the digital camera 200 and used from the SD card 214. In such a case, the digital camera 200 checks the user ID registered in the digital camera 200 with the user ID of the person identification reference database when the person identification reference database is recorded in the SD card 214 before starting photographing. If the user IDs correspond to each other at this point, the digital camera 200 perform the person identification check using the person identification reference database recorded in the SD card 214 in the digital camera 200 while capturing an image. In the operation, the digital camera 200 records the image in the SD card 214 while writing the corresponding person ID in the Exif information of the image.

In the above-described exemplary embodiments, the camera adapter device 100 or the digital camera 200 checks the user ID that indicates the user registered in the digital camera in advance with the user ID of the person identification reference database. As the result of the check, when the user IDs correspond to each other, the camera adapter device 100 or the digital camera 200 detects (extracts) a face included in the image, checks the face with the person identification reference database, and records the person ID as metadata. The camera adapter device 100 or the digital camera 200 can transfer and store the image to and in the storage terminal 400 via the LAN.

Further, in the above-described exemplary embodiments, the person identification reference database is stored in the portable external media storage. Accordingly, the user can carry the media storage. Thus, the user can carry the user's own person identification reference database, perform the face identification on another camera adapter system, transfer the image to the storage terminal, and store the image.

According to the above-described exemplary embodiments, the security problem can be solved while identifying a person included in an image captured by the imaging apparatus and storing information of the person with the image.

An aspect of the present invention may be achieved by reading program codes of software implementing the functions according to the above-described exemplary embodiments from a computer-readable storage medium and executing the read program codes by a central processing unit (CPU). Further, the functions according to the above-described exemplary embodiments may be implemented by executing a part of or entire processing using an operating system (OS) based on an instruction of the read program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2008-164976 filed Jun. 24, 2008, which is hereby incorporated by reference herein in its entirety.

What is claimed is:

1. An adapter device connected to an imaging apparatus, the adapter device comprising:
   an imaging apparatus user identifier acquisition unit configured to acquire a user identifier of a user of the imaging apparatus registered in the imaging apparatus;
   a database user identifier acquisition unit configured to acquire a user identifier of a user of a database for person identification, the database being stored in a storage medium inserted in the adapter device and the identifier of the database being recorded on the storage medium;
   an identifier determination unit configured to determine whether the user identifier of the imaging apparatus registered in the imaging apparatus corresponds to the user identifier of the database recorded on the storage medium;
   a person identification unit configured to perform an identification of a person included in an image acquired by the imaging apparatus by referring to the database;
   an addition unit configured to add personal information of the identified person stored in the database to the acquired image as attribute information of the acquired image when the person identification unit identified that the person included in the acquired image as a person registered in the database; and
   a control unit configured to inhibit the person identification unit to perform the identification of the person if the identifier determination unit determines that the user identifier of the imaging apparatus does not correspond to the user identifier of the database.

2. The adapter device according to claim 1, further comprising:

a transfer unit configured to transfer to a data storage device the image including the attribute information in which the personal information is recorded by the recording unit.

3. An imaging apparatus comprising:

an imaging apparatus user identifier acquisition unit configured to acquire a user registered in the imaging apparatus;

a database user identifier acquisition unit configured to acquire user identifier of a user of a database for person identification, the database being stored in a storage medium inserted in the imaging apparatus and the identifier of the database being recorded on the storage medium;

an identifier determination unit configured to determine whether the user identifier of the imaging apparatus registered in the imaging apparatus corresponds to the user identifier of the database recorded on the storage medium;

a person identification unit configured to perform an identification a person included in an image captured by an imaging unit by referring the database;

an addition unit configured to add personal information of the identified person stored in the database to the acquired image as attribute information of the acquired image when the person identification unit identified that the person included in the acquired image as a person registered in the database; and a control unit configured to inhibit the person identification unit to perform the identification of the person if the identifier determination unit determines that the user identifier of the imaging apparatus does not correspond to the user identifier of the database.

4. The imaging apparatus according to claim 3, further comprising:

a transfer unit configured to transfer to a data storage device the image including the attribute information in which the personal information is recorded by the recording unit.

5. A method for processing information in an adapter device connected to an imaging apparatus, the method comprising:

acquiring a user identifier of a user of the imaging apparatus registered in the imaging apparatus;

acquiring a user identifier of a user of a database for person identification, the database being stored in a storage medium inserted in the adapter device and the identifier of the database being recorded on the storage medium;

determining whether the user identifier of the imaging apparatus acquired from the imaging apparatus corresponds to the user identifier of the database acquired from the database recorded on the storage medium;

performing an identification of a person is included in an image acquired by the imaging apparatus by referring to the database; and adding personal information of the identified person stored in the database to the acquired image as attribute information of the acquired image when the person included in the acquired image is identified as a person registered in the database, wherein the identification of the person is inhibited if it is determined that the user identifier of the imaging apparatus does not correspond to the user identifier of the database.

6. A method for processing information in an imaging apparatus, the method comprising:

acquiring a user identifier of a user of the imaging apparatus registered in the imaging apparatus;

acquiring a user identifier of a user of a database for person identification, the database being stored in a storage medium inserted in the imaging apparatus and the identifier of the database being recorded on the storage medium;

determining whether the user identifier of the imaging apparatus acquired from the imaging apparatus corresponds to the user identifier of the database acquired from the database recorded on the storage medium;

performing an identification a person included in an image acquired by the imaging apparatus by referring to the database is allowed; and adding personal information of the identified person stored in the database to the acquired image as attribute information of the acquired image when the person included in the acquired image is identified as a person registered in the database, wherein the identification of the person is inhibited if it is determined that the user identifier of the imaging apparatus does not correspond to the user identifier of the database.

* * * * *